Jan. 24, 1950     L. E. SODERQUIST     2,495,664
VULCANIZING PRESS WITH AUTOMATIC BAGGER
Filed Dec. 29, 1948     12 Sheets-Sheet 1

FIG. 1

INVENTOR.
LESLIE E. SODERQUIST
BY
ATTORNEYS

INVENTOR.
LESLIE E. SODERQUIST
BY
ATTORNEYS

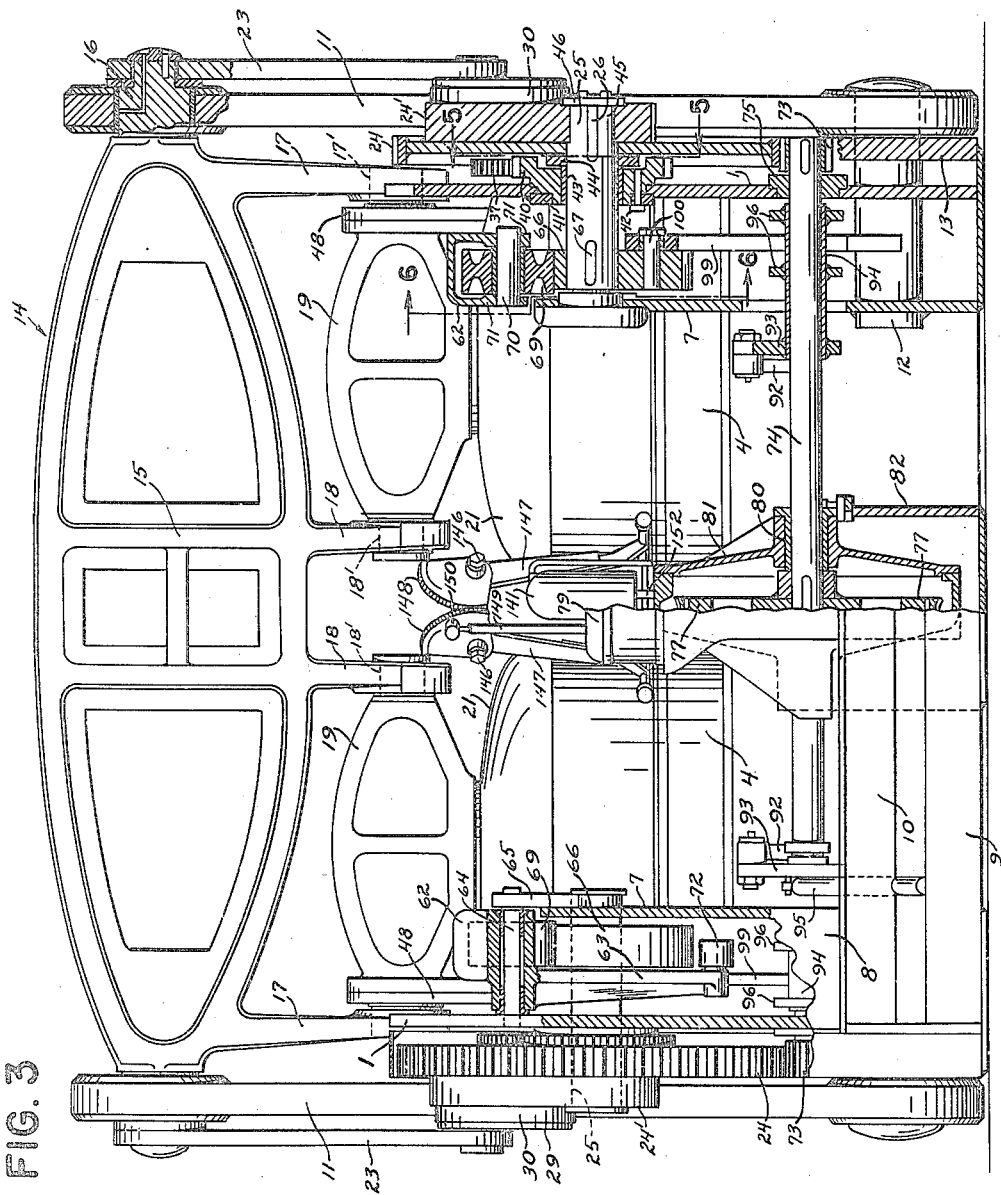

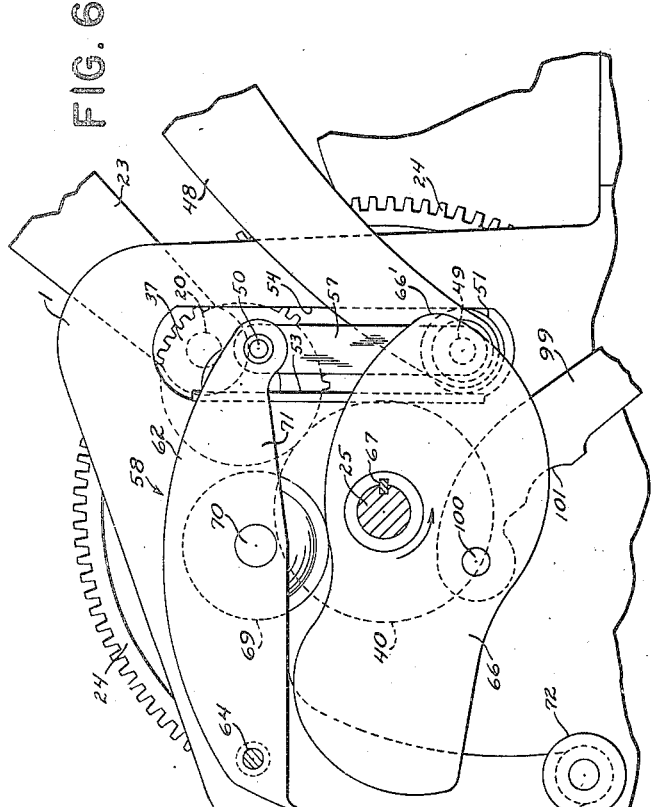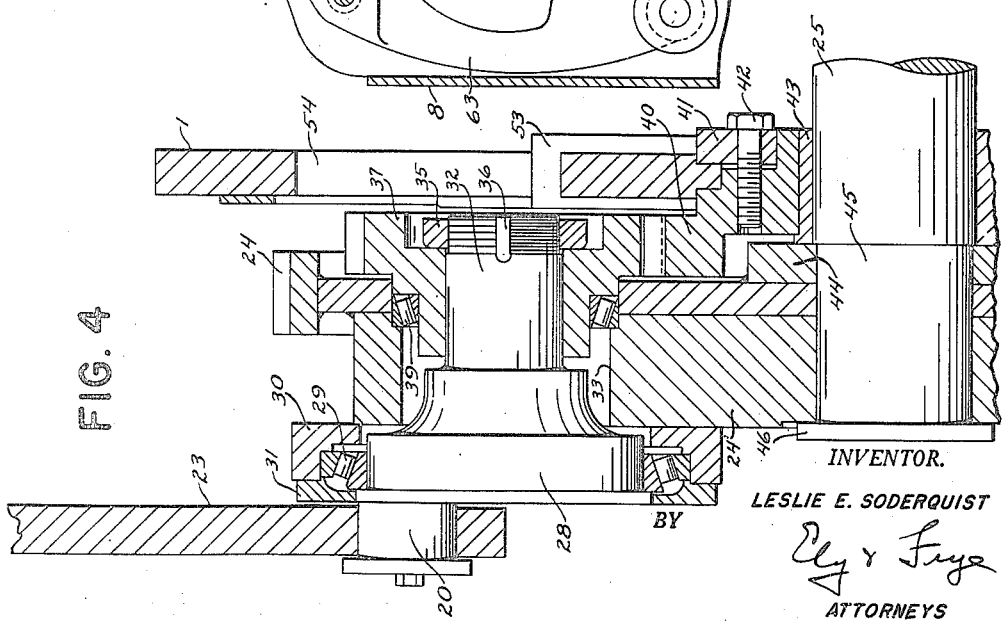

Jan. 24, 1950     L. E. SODERQUIST     2,495,664
VULCANIZING PRESS WITH AUTOMATIC BAGGER
Filed Dec. 29, 1948     12 Sheets-Sheet 6
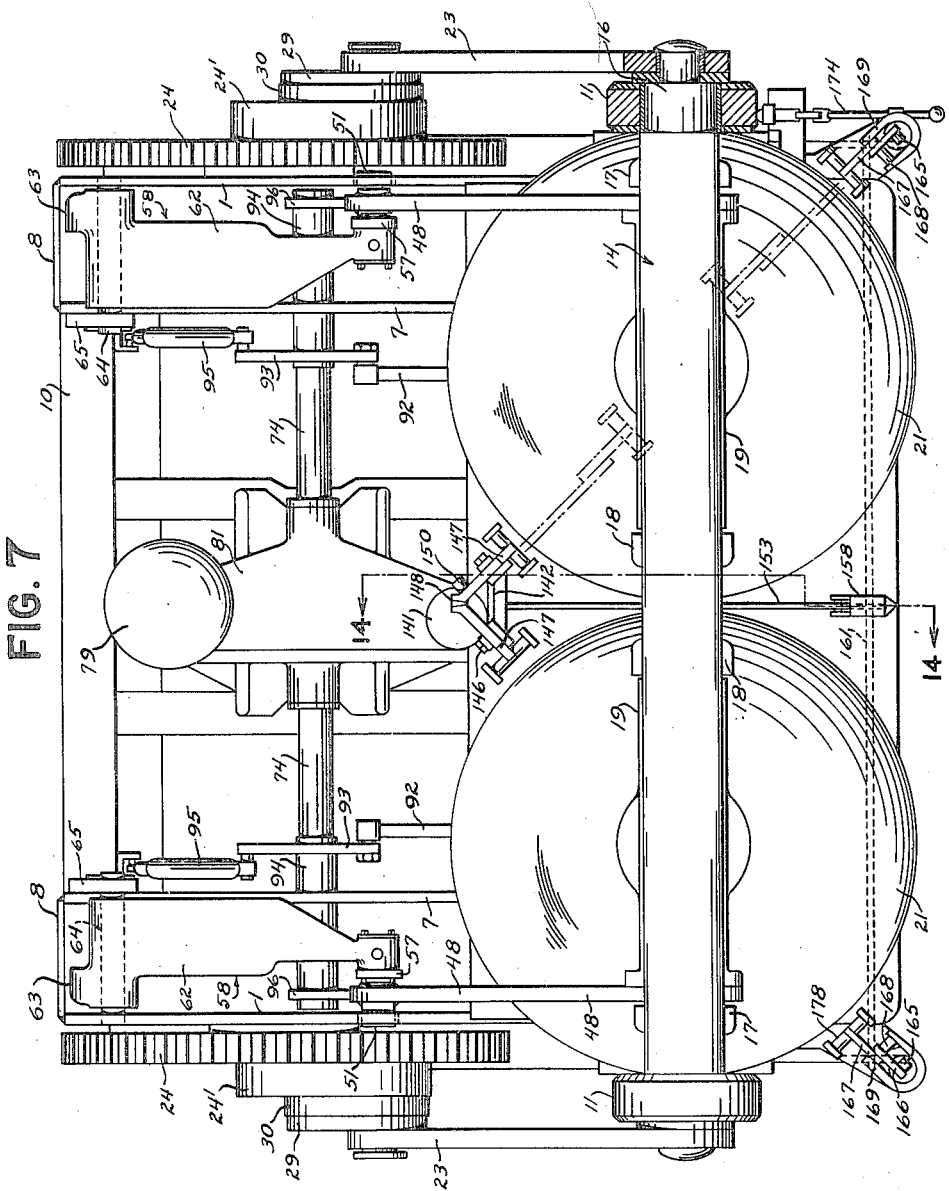
INVENTOR.
LESLIE E. SODERQUIST
BY
ATTORNEYS Jan. 24, 1950     L. E. SODERQUIST     2,495,664
VULCANIZING PRESS WITH AUTOMATIC BAGGER
Filed Dec. 29, 1948     12 Sheets-Sheet 7

INVENTOR.
LESLIE E. SODERQUIST
BY
*Ely & Frye*
ATTORNEYS

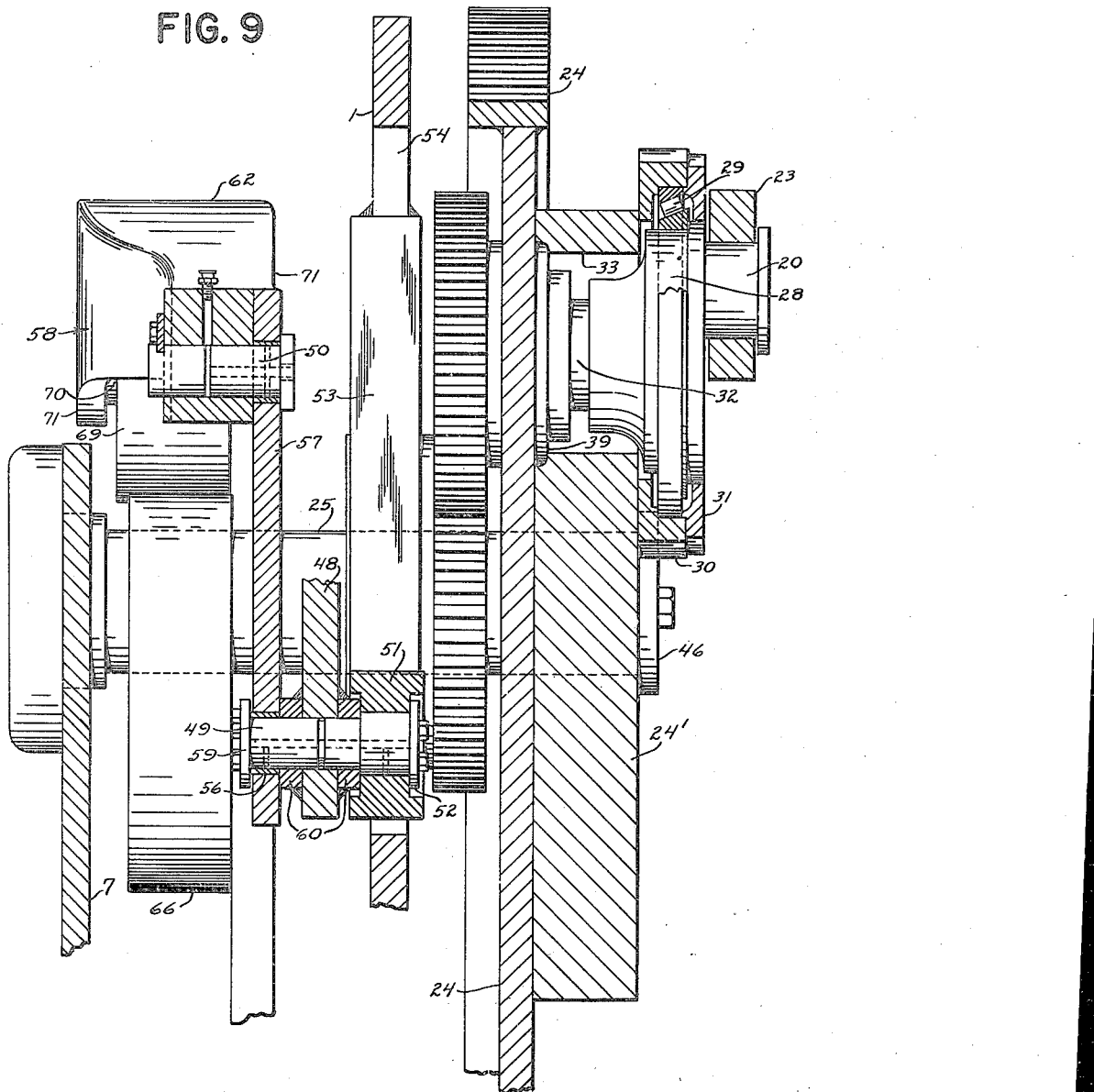

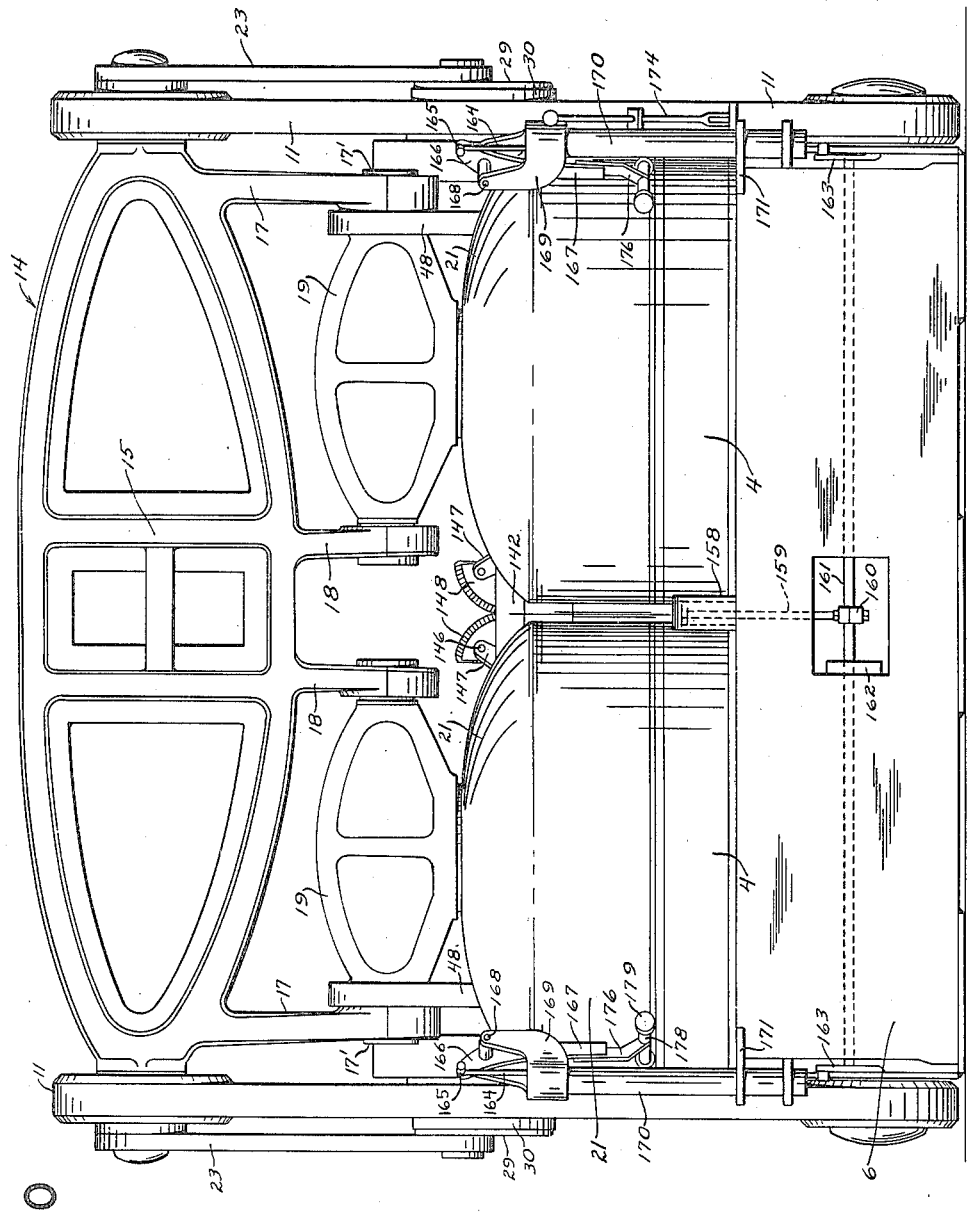

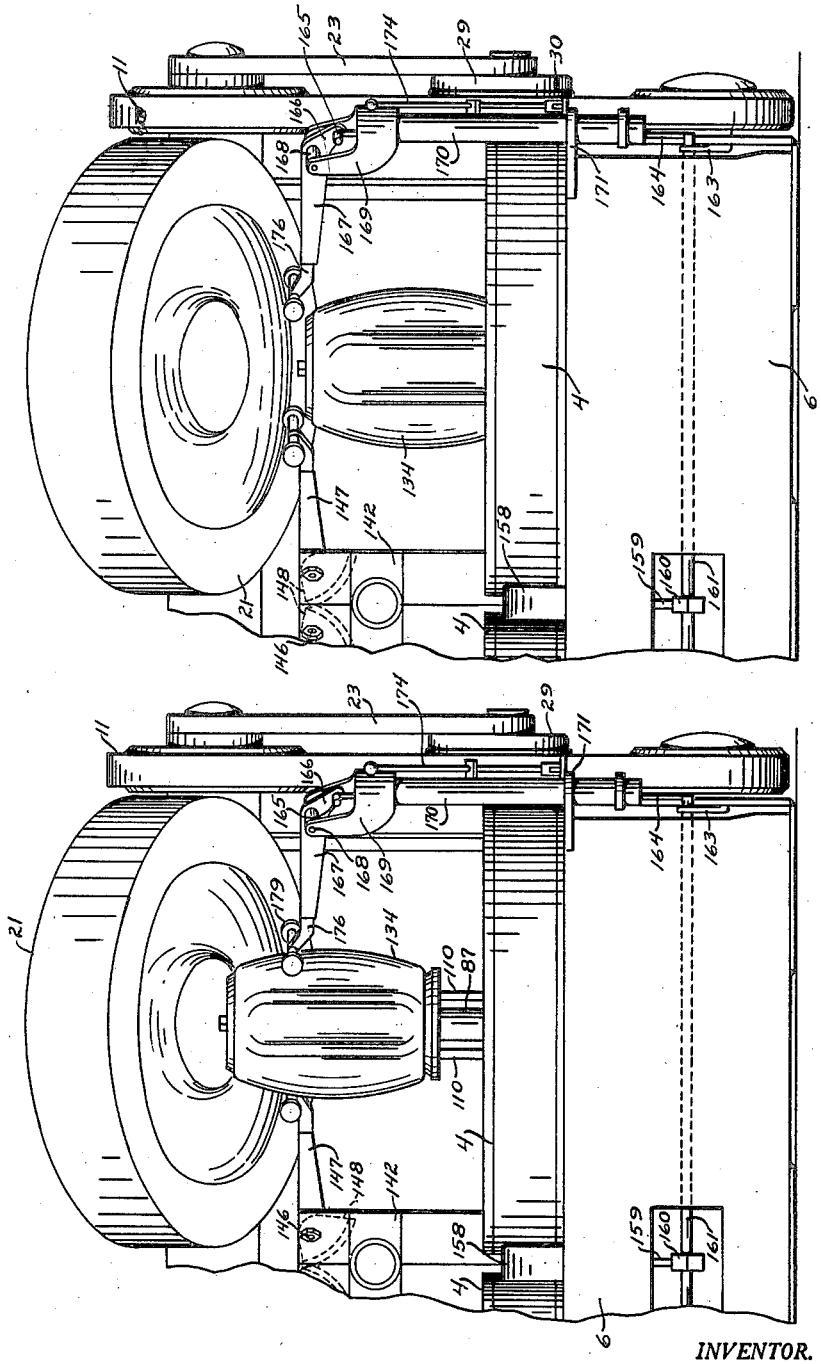

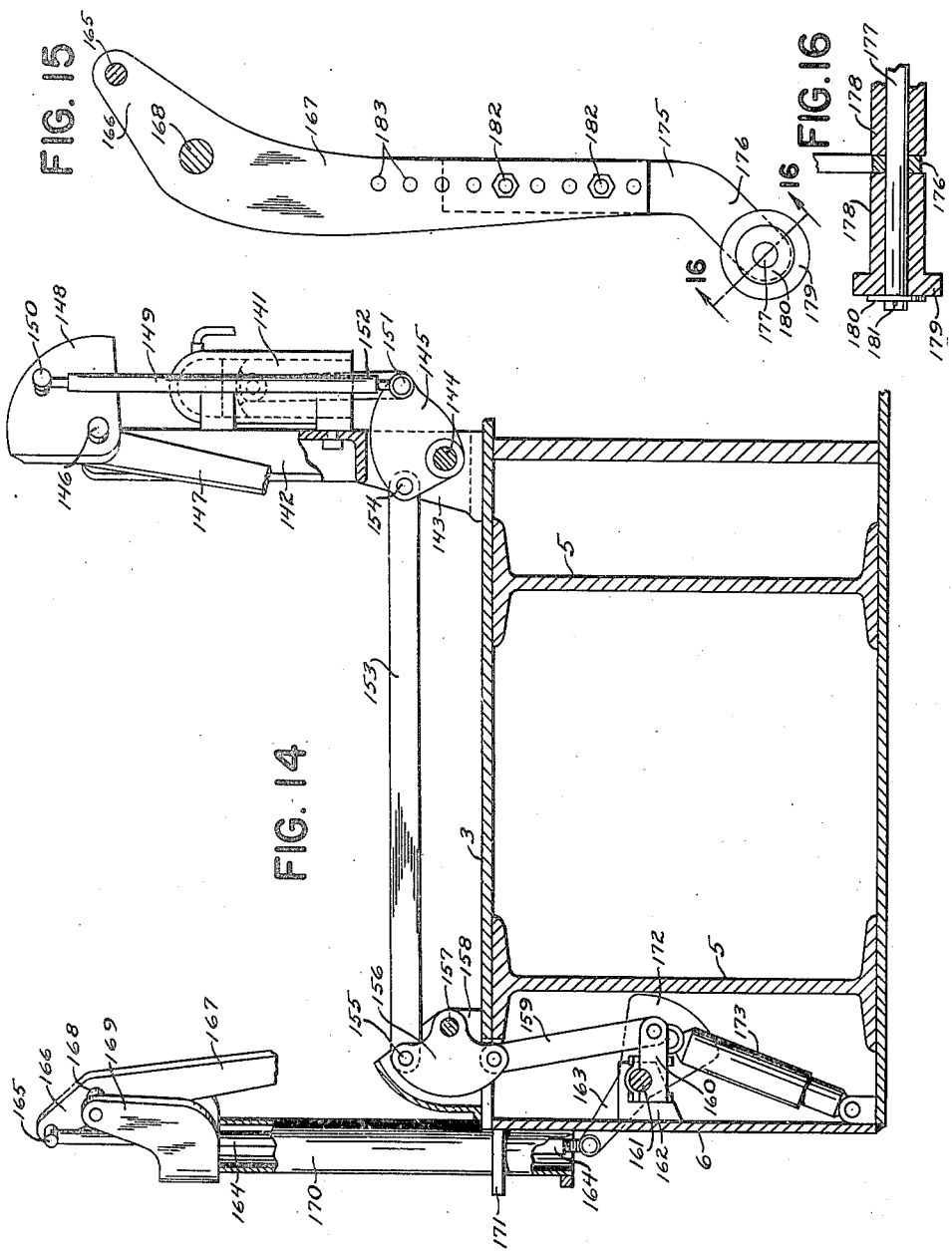

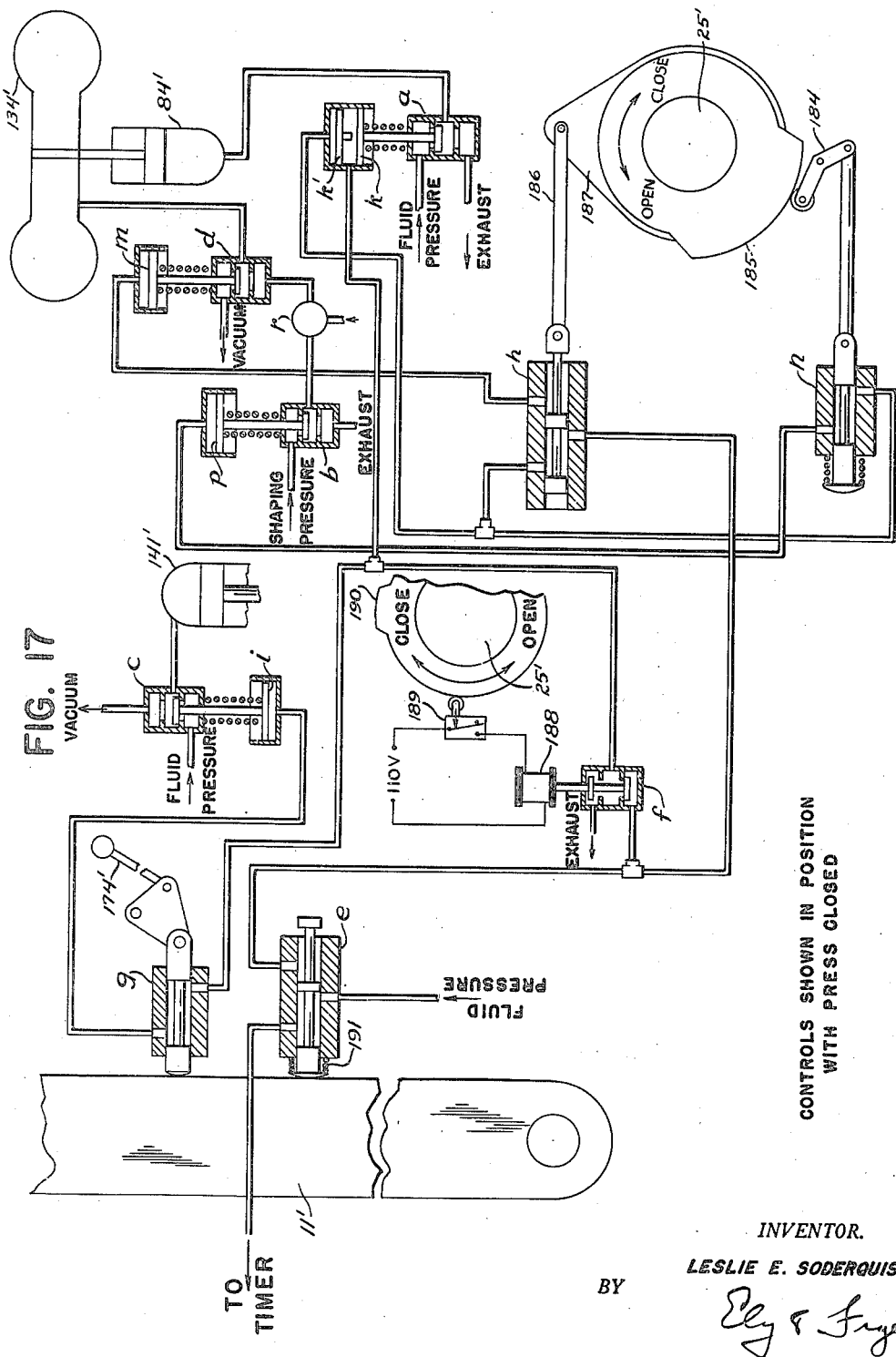

Patented Jan. 24, 1950

2,495,664

UNITED STATES PATENT OFFICE 2,495,664

VULCANIZING PRESS WITH AUTOMATIC BAGGER

Leslie E. Soderquist, Akron, Ohio, assignor to The McNeil Machine & Engineering Company, Akron, Ohio, a corporation of Ohio Application December 29, 1948, Serial No. 67,849

43 Claims. (Cl. 18—17)

This invention relates to a vulcanizing press, and in particular to a tire-vulcanizing press for use in connection with the "flat band" process of tire building in which a fluid-inflatable bag is used to shape the tire into final form prior to curing. As conventionally employed, presses of this type have involved the "watch case" construction in which an upper mold section is separated from a fixed, lower mold section in a swinging movement. In the opening of such a press it is desirable that the upper mold section move in such manner as to remain parallel to the lower section during the initial stages of opening and final stages of closing to avoid damage to the tire and, in fact, this parallelism should be continued for a considerable interval of the opening action in order to provide adequate working space for handling during insertion or removal of tires.

In my co-pending application Serial No. 686,120, filed July 25, 1946, there is shown a press of this general type in which the bag for shaping a tire is attached to the press and comprises a "blanket" or diaphragm having upper and lower rings disposed along the axis of the bag which move toward each other along such axis when the bag is inflated and which move away from each other in the collapsing action of the bag, during which collapse the bag is stripped from a cured tire. The press shown in the said application is of the single toggle type in which the main driving gears have their common axis located in a vertical plane containing the axis of the mold. It is a shortcoming of such an arrangement that shafts of extremely large diameter are required for the main gears and they must have considerable axial extent for bearing purposes. A further unfavorable aspect is that the lower mold section must be located at a height which renders awkward the handling of tires into and out of the press. The first-mentioned condition can be alleviated somewhat by extending a continuous shaft from one side of the press to the other but this is impractical where bag-actuating mechanism is employed beneath the lower mold section. Furthermore, it is presently desirable to employ presses in banks of two and in such case the enumerated disadvantages are aggravated.

It is known that the foregoing difficulties are obviated by the employment of a double or compound toggle mechanism. However, the extent of opening of the press practical with conventional toggles of this type is not sufficient to provide the working space demanded by the extensible bagging mechanism, especially for use in the curing of larger sizes of tires. This applies not only to the extent of opening but also to the extent of opening during which the mold sections must remain parallel, which is greater in the case of the extensible bagger than where the tire and bag are removed from the press together; also, the harmonizing of the various movements becomes difficult. In the known forms of press toggles, both simple and compound, it has been conventional to defer tilting of the upper mold section while opening, by the employment of a cam to control the motion of a guide arm rigid with the link carrying the upper mold section. The required increase in extent of opening of the mold and the required harmonizing of motions are, in the case of the compound toggle, impractical of attainment by cam design alone. In the press of the present invention this is accomplished by modification of the path of the point of load application to the first or input toggle, whereby the speed of press motion is better adapted to the operation of platen leveling.

In the said prior application, I have shown the tire-shaping blanket or diaphragm as having two end rings which are mounted to approach and recede from each other by means of a telescoped mounting having a slip fit. This relative movement permits inflation of the diaphragm by approach of the rings and collapse thereof by recession of the rings. By my present arrangement I eliminate the slip fit in the structure supporting the rings and provide for extension of the diaphragm by upward motion of the upper ring only. In my present arrangement the stripping of the tire from the bottom mold section is occasioned by a positive mechanical lifting of the bagging mechanism as a whole and the stripping of the bag from the tire is accomplished by the said motion of the upper ring. During the elongation of the bag, which strips it from the tire, a set of fluid-operated tire-holding arms are caused to swing inwardly to a position beneath the tire. These arms serve to gradually lift the tire, during the time the bag is being removed, to a final, elevated position. Following this, the bagging mechanism as a whole is permitted to drop to facilitate removal of the cured tire and the insertion of a "green" tire.

It is therefore an object of the invention to provide a vulcanizing press of the compound toggle type providing for proper press opening to accommodate an upwardly extensible bagging mechanism. It is a further object to provide, in a press, a fluid-expansible bagging mechanism extensible along an axis by resilient means. Still another object is to provide, in a press having an axially extensible bagging mechanism, a tire lifter and holder engageable therewith during extension of the bagging mechanism through a swinging motion and resiliently urged. More particularly, it is an object to provide a press with a tire-shaping device movable bodily by positive mechanical means and removable from a tire by extension along an axis through resilient means.

A still further object is to provide a press of the compound toggle type in which mold opening suitable in character and extent is possible through modification of the path of the point of load application to the input toggle.

These and other objects, which will be in part apparent and in part made manifest as the description proceeds, are attained by the invention, certain embodiments of which are described in the accompanying specification and illustrated in the drawings, in which:

Fig. 1 is a side elevation of the press in closed position and partly broken away to show the bagging mechanism and main worm drive.

Fig. 3 is a rear elevation with the right hand portion sectioned along the line 3—3 of Fig. 1 and broken away on the left hand side to show other details.

Fig. 4 is an enlarged section taken along the line 4—4 of Fig. 1, showing details of the planetary gearing.

Fig. 6 is an enlarged section taken on the line 6—6 of Fig. 3.

Fig. 7 is a top plan view of the press.

Fig. 9 is an enlarged section taken on the line 9—9 of Fig. 1.

Fig. 10 is a front elevation of the press in closed position.

Figs. 11, 12 and 13 are partial views similar to Fig. 10 showing successive stages of opening of the press and operation of the bagging mechanism and tire holders.

Fig. 14 is a view taken on the line 14—14 of Fig. 7 with all mechanism removed except the tire lifters.

Fig. 15 is a detail showing a tire-lifter arm in side elevation.

Fig. 16 is a view taken along the line 16—16 of Fig. 15; and

Fig. 17 is a schematic diagram showing the arrangement of the control valves for the tire-shaping and tire-lifting mechanisms.

Figure 2:
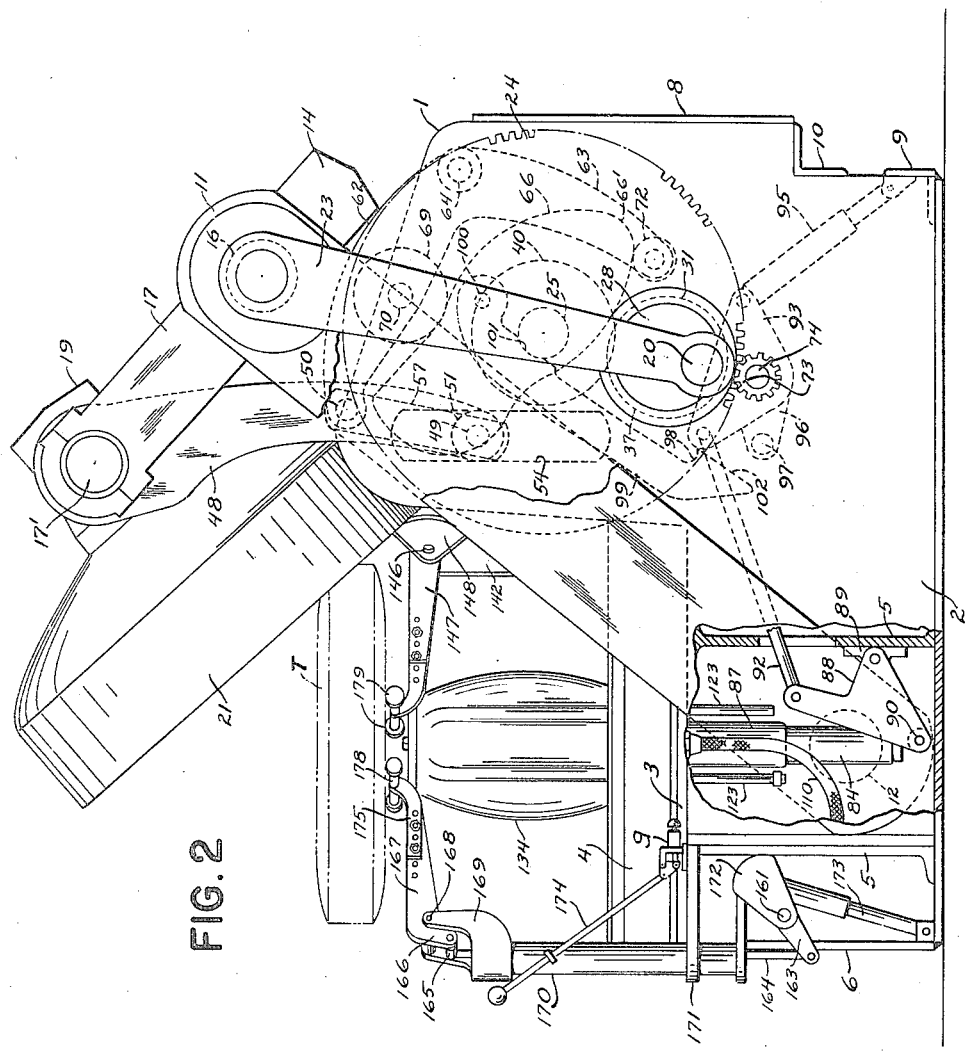
Fig. 2 is a view similar to Fig. 1 with the press in open position.
Figure 5:
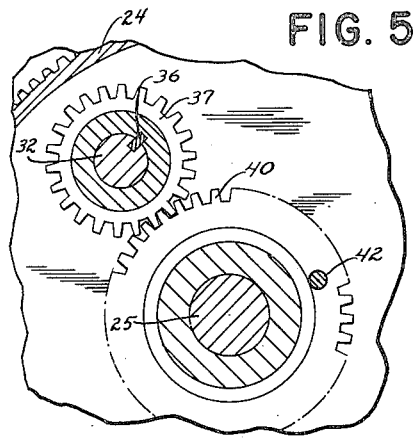
Fig. 5 is an enlarged section taken on the line 5—5 of Fig. 3, further showing the planetary gearing.

The press as a whole is supported in a frame comprising side plates of generally L-shape with rear, upright portions 1 and front, lower skirt portions 2. Since the press is symmetrical about a plane midway of these plates, similar reference characters will in general apply to similar parts on either side of the said plane. A table 3, forming a support for the lower mold portion 4 and steam platen 4' and adapted to resist the loading pressure of the press, is supported on skirt portions 2 and, additionally, on spaced auxiliary supports such as I-beams 5. Skirt portions 2 are joined by a further structural supporting member in the form of a front plate 6. Spaced inwardly from and parallel to upright plate portions 1 is a pair of plates 7 which afford extended bearing support for the crank mechanism and define a housing for parts associated therewith, as will presently appear. Inner plates 7 are attached, as by welding, to the table 3 and to plate portions 1 through panels 8 (Fig. 3). The rear structure is chiefly supported on and made rigid by angle bars 9 and 10.

*The toggle mechanism*

The toggle mechanism is of the compound type wherein one toggle linkage is anchored at the base of the press for swinging motion and rockably journals, at its upper end, the top mold portion, and the compounded toggle linkage comprises a crank connected to the upper end of the first toggle through a link arm. In the present machine certain drawbacks in the compound toggle, in its use with a bagging mechanism, such as those due to the variable speed incident to simple crank motion, are eliminated.

Referring to the drawings, and particularly Figs. 1 and 3, the primary or output toggle consists of a long rigid arm 11 rotatably carried on a large pin 12 passing through and fixed to upright plates 1 and 7 and an additional sturdy plate 13 carried on the framework. The primary toggle is completed by mechanism carrying the top mold section housing and shown generally at 14. This mechanism comprises a heavily reinforced cross member 15 trunnioned in the top portions of arms 11, as at 16, in anti-friction sleeves. Member 15 has depending arms 17, 18 in which are trunnioned, as at 17', 18', cross members 19, from which upper mold section housings 21, with platens 21', depend. The upper mold section housings are therefore rockable in the depending arms 17, 18 and, as will be shown, suitable mechanism is provided to maintain the top housings 21, through this rockable connection, parallel to the bottom housings 4 for a considerable interval of the separation or approach of the mold portions. It will be seen that upon swinging of the arms 11 to upright position considerable force can be applied between the upper and lower mold sections.

The mechanical advantage is further increased by provision of a toggle linkage to impart the force for turning the arm 11 about the lower pin 12. This secondary linkage is made up essentially of a connecting link 23 extending from the trunnion of the upper cross member 15, on which it is journaled, and pivoted eccentrically on a pin 20 carried by a large gear wheel 24 in a manner presently to be explained. The wheel 24 is fixed to a shaft 25 as by a key 26, the shaft 25 being supported by plates 1 and 7. It will be apparent that as pin 20 approaches a line between trunnion 16 and shaft 25 by rotation of gear wheel 24, a very considerable force will be imparted to turn arm 11 about its anchor pin 12. This is the compounded, input toggle action.

In the opening and closing of the mold portions it is highly desirable to control the upper portion so that it remains parallel to the lower portion for a considerable distance of its travel. By mechanism to be described this is accomplished in the present machine, as in conventional machines, by linkage including a cam. However, in the use of a crank arm secondary or compounded toggle, especially in a press where platens must be maintained parallel for an unusually large distance to accommodate a built-in, extensible bagging mechanism, the varying rates of the motion of the press incident to the employment of a circular path for the crank end of the connecting link interposes conditions which render the use of a platen-leveling cam, alone, inadequate. In the conventional crank arm, compound toggle press, the connecting link from the crank arm is very nearly aligned with a radius of the crank wheel in the closed condition of the press. As the crank wheel commences to turn from this position, the motion of the crank pin is largely lateral of the longitudinal extent of the arm, and for a considerable angle of turn of the crank wheel there is relatively little opening of the press. This represents a degree of lost motion which it is desirable to utilize, especially where the platens must be maintained parallel for a considerable distance of opening. On the other hand, as the crank wheel reaches a position where the radius to the crank pin is perpendicular to the longitudinal extent of the connecting link, the opening of the press, in the conventional arrangement, is quite rapid, and since the platens, for present purposes must still be maintained in parallelism at this stage, cam design for the purpose becomes well-nigh impossible. Means are provided therefore to modify the motion of the connecting link to speed opening of the press in the early stages, retard it in the intermediate stage, and again speed it in the final stages where platen parallelism is no longer necessary, by imparting motion to the crank pin relative to its supporting crank gear. In effect, such motion is a smoothing out of the wide changes in velocity of the crank end of the connecting rod, and it is obtained by mounting the crank pin eccentrically on a planet gear journaled in the main gear and engaging the planet gear with a sun gear which is concentric with the main gear but fixed rigidly to the main gear bearing.

As shown in Fig. 4, the crank pin 20 is fixedly carried on a drum 28 rolling on anti-friction bearings 29 in a recess in a boss 30 fixed to a large boss 24' on the flange of gear 24. A locking plate 31, screw-fixed to the boss 30, holds the bearing 29 in place. A reduced extension 32 on the drum extends through an opening 33 in boss 24' and a slightly larger concentric opening in gear 24 and carries, by means of nut 35 and key 36, a planet gear 37 with anti-friction bearings 39 on the inner side of the assemblage of gear 24. Planet 37 is geared to a sun gear 40 fixed to plate 1 by a clamp ring 41 and bolts 42. Shaft 25 is trunnioned on plate 1 by journal sleeve 43 held centrally of the sun gear 40. The gear wheel assemblage, including an inner reinforcing hub 44, is carried on a reduced neck 45 of shaft 25 and has an outer cover plate 46 bolted in position.

As the gear 24 rotates, the planet 37 is constrained to turn on the fixed sun gear 40, carrying with it the drum 28 and thus varying the radial position of the crank pin 20 with respect to shaft 25. By reference to Fig. 1 it will be seen that if the pin 20 were at a fixed radial distance from the shaft 25 the motion of the connecting arm 23 to swing the main toggle arm 11 would be very small in the initial stages of opening of the press and would be relatively rapid in a position where the arm 23 was perpendicular to a radius of the wheel 24. By means of the planetary gear, however, the motion of the arm 23 is speeded up in the initial movement from the position shown in Fig. 1, over the speed it would have if the crank pin moved in a circular path, and slowed in the stages which would ordinarily involve maximum speed of the arm 23, thus resulting in a substantial slowing movement of trunnion 16 at stages which ordinarily would have involved its maximum speed. Due to this slowing, design of a cam for retaining the platens parallel becomes a resonable matter.

The platen leveling device

As seen in Fig. 3, the arm 23 is journaled on a reduced portion of the trunnion 16 of cross member 15. The cross member 19 of the upper mold portion is freely trunnioned in the arms 17, 18 and its inclination is controlled by integral links 48. The rear end of each link 48, as seen in Figs. 1 and 6 and in detail in Fig. 9, carries a pin 49 having on one enlarged end a roller 51 retained by a bolted disc 52 and engaging between guide plates 53 fixed to the edges of a slot 54 in the plate 1. The other end of the pin 49 is journaled in a bearing sleeve 56 in an arm 57 connecting through a pivot 50 with a cam follower shown generally at 58. Arm 57 is retained on pin 49 by a bolted retaining disc 59 and the arm 48 is afforded increased bearing surface for pin 49 by means of integral bosses 60.

The cam follower, best shown in Figs. 3 and 6 and in top plan in Fig. 7, is generally elbow-shaped and comprises a wide, upper, generally horizontal arm 62 and a dependent arm 63 staggered outwardly of the top portion 62. The apex of the follower is journaled on a pin 64 carried between plate 1 and an upwardly extending bracket 65 fixed to plate 7 and thus is adapted to oscillate on the pin in response to motion of a cam 66. The latter is keyed as at 67 to shaft 25 for rotation with the wheel 24 and engages a roller 69 rotatably carried on a pin 70 carried by dependent flanges 71 on the top follower arm 62. The dependent arm 63 carries a roller 72 extending into the path of the cam 66 for a purpose later to be described.

The gear 24 is driven by a spur gear 73 keyed on a shaft 74 running across the machine and supported in bearings 75 in the plates 1. Shaft 74 carries a central worm wheel 77 driven by a worm 78 carried on the shaft of a motor 79. Shaft 74 has central support in bearing sleeves 80 in the hub of a worm wheel housing 81 which is fixed to a pair of brackets 82. Additional elements journaled on shaft 74 will be later described in connection with the bagging mechanism.

Operation of the toggle mechanism

Referring to Fig. 1, as gear 24 rotates clockwise, the arm 23 pulls arm 11 in a clockwise swing about pin 12. Arm 48 is fixed to the upper mold unit 19 and it will be observed that if pin 49 were fixed the unit 19 would immediately commence to swing about trunnion 17' and the upper mold section would separate from the lower mold section in an angular movement. This is avoided, in the initial stages of opening, by raising the pin 49 at an appropriate rate.

It will be seen that the position of the pin 49 at any instant is governed by the position of the cam 66 (rotatable with gear 24) relative to the roller 69 (supported on the machine framework through the anchorage 64 of the follower). As the gear 24 rotates, the upper portion of cam 66, as seen in Fig. 1, raises arm 62 of follower 58, and hence link 57, to raise pin 49 in vertical guides 53. This neutralizes any swinging tendency of link 48 and member 19 and keeps the upper mold section parallel to the lower mold section. This parallelism is maintained until the follower roller passes over the steepest portion of the cam, shown at the extreme left of the cam in Fig. 1 and indicated by 66', and thereafter the pin descends in the guides 53 to effect swinging of the upper mold section. As stated before, the modification of the path of the pin 20 from a truly circular orbit permits reasonable cam design within permissible values of mechanical advantage to maintain parallel opening motion of the press through a relatively large extent thereof, a situation which would not be possible with the conventional form of compound toggle.

The combined effect of the planetary movement of the pin 20 which actuates the link 23 and the vertical movement of the roller 51 during the opening movement of the press, is to give to the upper mold section a long range of travel while maintaining the upper and lower mold section in parallelism. This is a very substantial advance in press design because it enables large tires to be cured in a press utilizing a "blanket" or diaphragm as the expanding medium for the tire.

The arm 63 and roller 72 of the cam follower are provided to counteract any tendency of the upper mold section to skew in the final stage of closing of the press. In conventional platen-leveling devices, the rollers, such as 51, are free to move upward and this has resulted in skewing of the upper mold section with the front portion closing sooner than the rear portion. However, such tendency is defeated by contact of roller 72 with cam 66.

*The bagging mechanism*

Broadly stated, the bagging mechanism operates through motion axially of the mold of a telescoping member, shown generally at 83, the lower, outer portion of which is shown at 84 and the inner-upper part being shown at 85. The member 83 as a whole is movable through a housing 87, later to be described in detail, carried by the shelf 3. Movement of the member 83 as a whole serves to separate a cured tire from the lower portion of the mold and movement of inner, upper portion 85 relative to portion 84 is associated with raising and lowering of the upper ring of the bag axially of the mold on collapse or distension of the bag, respectively. The first-mentioned tire-separating movement, which is occasioned by mechanism associated with the toggle-actuating gear 24, will first be described.

A bell crank 88 composed of parallel plates in the form of an inverted "figure 4" integrated by a member 88' is pivoted to a bracket 89 fixed to one of the supporting I-beams 5. The free end of the bell crank carries a roller 90 engageable with the underside of member 84 and the other arm of the bell crank is connected through a tie rod 92 with one arm of a bell crank 93 rotatably carried on drive shaft 74 through a sleeve 94 to which it is fixed (see Fig. 3). The other arm of bell crank 93 is connected to a one-way check device 95 which serves to cushion the free fall of member 83 through the linkage just described. Sleeve 94 also carries a lever consisting of parallel plates 96 bearing a roller 97 which is engageable by a hooked end 98 of an arm 99, the latter being pivoted at 100 to the cam 66 from which it depends by virtue of its own weight to dwell against roller 97. As cam 66 rotates with gear 24 in the opening of the press the edge of the arm will slide downward across roller 97 and thence upward still in contact with the roller. When hook portion 98 engages roller 97, the sleeve 94 is caused to turn on shaft 74 carrying with it the bell crank 93 with a resulting lift of the member 83, through the linkage shown, and stripping of a cured tire from the lower portion of the mold. As member 83 reaches its uppermost position, the mold has attained very nearly its fully open position and the machinery stops automatically, debagging taking place thereafter pneumatically as will be explained. At the stopping of the machine, an arcuate slot 101 in the hook arm 99 is somewhat short of contact with shaft 25 of gear wheel 24. At this stage, as will be presently described, support is introduced for the elevated tire and the bag is stripped from the tire. Thereafter, the bagging mechanism is lowered by removing hook 98 from its engagement with roller 97. This is accomplished by again starting the machinery by means of a push button. The resumed rotation of shaft 25 brings arcuate slot 101 of arm 99 into contact with the shaft 25 when the press is about seven-eighths open, resulting in a separation of hook portion 98 from roller 97, whereupon member 83 descends, the bell cranks resume their original positions and the press continues to fully open position and stops automatically. In the closing movement of the press, the gear 24 rotates counterclockwise and the arm 99 is lowered to a position where the hook portion 98 is in readiness to again pick up the roller 97. In order that the arm 99 may ride over the roller 97 when descending, an extended flat portion 102 is provided at the end of the arm.

Figure 8A:
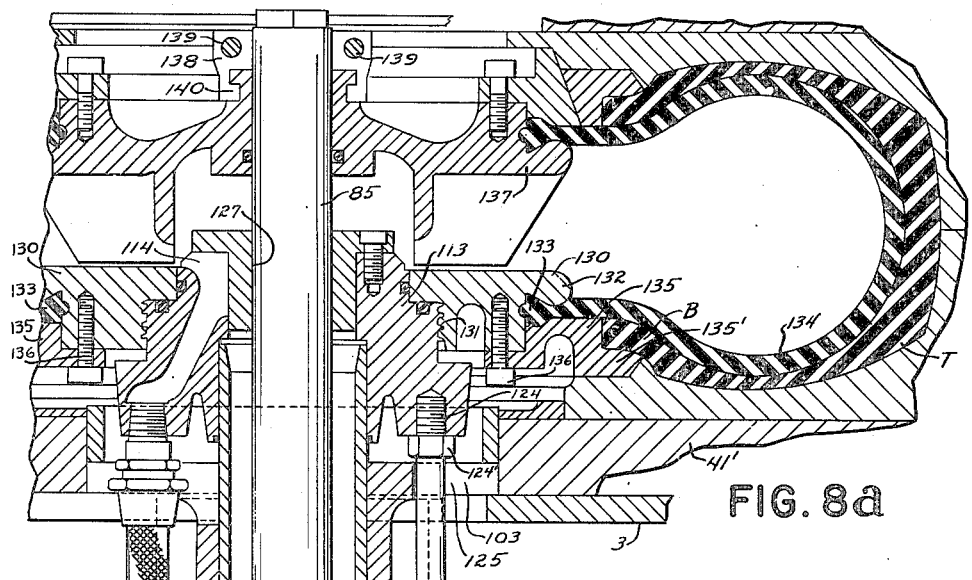
Fig. 8a is a section taken on the right angular line 8a—8a of Fig. 8.
Figure 8:
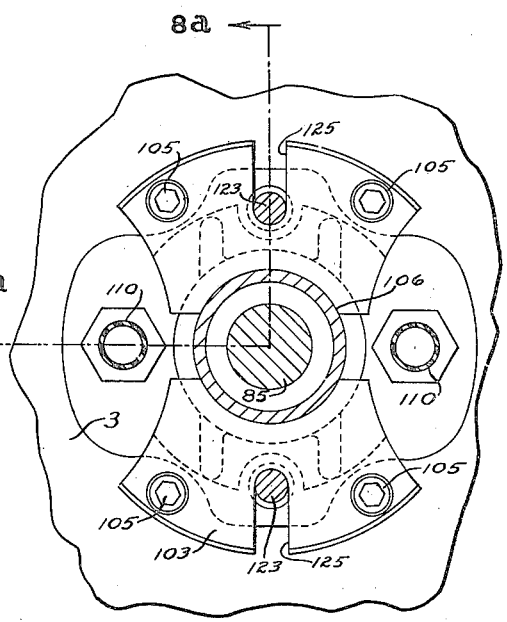
Fig. 8 is a section taken along the line 8—8 of Fig. 1 through the bagging mechanism cylinder and its support.

The fluid-operated features of the bagging mechanism are shown in enlarged detail in Figs. 8 and 8a. The stationary portion comprises a cap piece, consisting of a pair of arcuate flanges, 103, which is secured in place on shelf 3 by bolts 105. Depending from the cap piece 103 is an integral, tubular portion 106 providing bearing surfaces 107 for sliding of the cylinder 84 and defining between the respective bearing surfaces a grease chamber 108. Outwardly of the tube 106 and integral with the lower bag clamp anchor 113 is a pair of diametrically opposed flexible tubes 110, arranged to communicate to the bag, in any position of the cylinder 84, fluid pressure, whether liquid or gas, from a source not shown. Such communication is had through a manifold 114 in the lower bag clamp anchor 113 leading to the interior of the bag.

The cylinder 84 has a bottom closure plug 119 with a pressure inlet 120, the plug being received in a counterbore 122 in the cylinder 84 and being soldered thereto as at 122'.

A pair of diametrically opposed guide rods 123 studded in the underside of member 113 as at 124 and locked by nut 124' are arranged to slide in radial slots 125 in the cap piece 103. Parts 84, 113 and 123 move in unison, together with flexible tubes 110 and rod 85 relatively to fixed member 87. In addition, the rod 85 may reciprocate with respect to cylinder 84, being slidably received in a central bore 127 in the manifold member 113 and having bolted to its lower, reduced end 128 a piston 129 slidably fitted in the cylinder 84 and having suitable, fluid-tight packing. A tubular spacer 85' surrounding rod 85 limits upward movement of piston 129 and is provided with a shock absorbing spring 111 engaging under a washer 111' and surrounded by a sleeve 111". The sequential operation of the various parts just described will be set forth in detail in connection with a description of the valve controls hereinafter.

The lower bag clamp 130 is attached as by screw threads 131 to the clamp-anchor 113 and has a headed flange 132 to engage behind a bead 133 of the shaping bag 134 in cooperation with a backing member 135 attached as by screws 136 to clamp 130. The backing member 135 has an extension 135′ underlying the bead B of the formed tire T to provide for stripping the latter from the lower mold section during the rise of the member 83 as a whole. The upper clamp 137 has has a generally similar arrangement applied reversely to that of clamp 130 (except for the extension 135′) and is fastened to piston rod 85 by means of a diametrically split annulus 138 and bolts 139, the annulus having a lower, inwardly directed flange 140 engaging in a complementary groove in the hub of upper clamp 137. Obviously, motion of cylinder 84 will move the bag as a whole and relative motion between rod 85 and cylinder 84 will contract or permit distension of the bag depending upon direction of the motion.

The tire-holding mechanism

The tire-holding mechanism is shown in part throughout the various views of the drawings and more particularly in Fig. 14. It comprises four stations having tire-holding arms swingable into horizontal position, two closely adjacent stations midway and rearwardly of the molds and one station at each of the front corners of the machine, all being interconnected for action in unison under the urging of a single prime mover. The latter comprises an air cylinder 141 attached to an upright 142 of generally V-section carried by plate 3 and having a base portion 143 mounting a pivot 144 and a bell crank 145 through which connection is made to the front tire-holders. Pivoted in the upper sides of upright 142, as at 146, are the tire-holding arms 147 having integral toothed sectors 148 extending beyond the pivot, said sectors being in mutual toothed engagement. Lifting of the rear holders is effected through tie rod 149 pivoted to a geared sector as at 150 and to bell crank 145 at 151. A piston rod 152 leading from air cylinder 141 is also pivoted at 151. Downward motion of the rod 152 will cause upward motion of holding arms 147 and also communicate a lifting effort to the front holders through a connecting rod 153 pivoted to bell crank 145 at 154 and extending centrally of the machine from front to rear. The rod 153 is pivoted at 155 to a front bell crank 156 rockable on a shaft 157 supported in a bracket 158 carried by shelf 3. To the lower arm of bell crank 156 is pivoted a downwardly extending connecting arm 159 which is also pivoted to a short lever 160 clamped around a cross shaft 161. The latter is journaled in the side plates 1 of the machine and in a central bracket 162 carried by the front plate 6. On each end of the shaft is fixed a double lever with one arm 163 pivoted to the lower end of rod 164, the upper end of which is pivoted at 165 to the short, rear extension 166 of a front tire-holding arm 167. The latter is fulcrumed at pivot 168, carried by a bracket 169, fixed to a tubular housing 170, carried by a bracket 171 attached to the side plate 2 of the machine, and which housing surrounds the rod 164. It will be clear from the linkage described that front holding arms 167 will swing upwardly in unison with rear holding arms 147. A weighted, rearward extension 172 of lever 163 is pivotally attached to a shock absorbing member 173 which slows the rise of arms 147 and 167 when pressure in the air cylinder 141 is introduced.

As seen in Fig. 15, the tire-holding arms are adjustable in length. The arm illustrated, 167, has an extension 175 upturned as at 176 and carrying near its end a shaft 177, on opposite sides of which are received rollers 178 having flanged ends 179 and retained by washers 180 held as by pins 181. The extension 175 is attached to arm 167, as by a pair of bolts 182, and is selectively positionable by a series of bolt holes 183.

The bagging controls

The controls about to be described have to do with operation of the "bagging" mechanism other than the preliminary mechanical lift due to action of hook 99 which strips the tire from the mold, and they will include operation of the tire-holding arms. A schematic layout of the controls is shown in Fig. 17. Those parts of the machine already described which are functionally identified with the valve mechanism are indicated in this figure by their proper reference numerals qualified by priming, because shown in schematized form. These include the main link 11 of the toggle mechanism, the pressure cylinder 141 for the tire-holders, the bag-extending cylinder 84, the bag 134, and the hand lever 174. Elements 84′, 134′ and 141′ are served from separate sources of supply at different pressures by valves $a$, $b$, and $c$, respectively. A valve $d$ controls release of pressure from bag 134′ to vacuum. All the rest of the valves function as control members for the valves $a$, $b$, $c$, and $d$. A valve $e$ controls the main supply of pressure leading to the said control valves. In the closed position, as shown, valve $e$ actuates a timer for the curing control of the press. Valve $e$ communicates with a control diaphragm $i$ of valve $c$ through two valves $f$ and $g$, in series, and the control pressure is led to a valve $h$ from the line between $e$ and $f$, and to a double diaphragm valve control $k$, $k'$ from the line between $f$ and $g$. Control diaphragm $k$ is connected directly to the slider of valve $a$. Control diaphragm $k'$ also actuates this slider through diaphragm $k$ and is actuable by a line from valve $h$. The latter in an adjusted position conducts pressure from valve $e$ to a diaphragm $m$ which actuates the slider of valve $d$. From the line between $h$ and $k'$, the pressure is led through a valve $n$ to a diaphragm $p$ to actuate valve $b$. Valve $n$ is actuable through a bell crank 184 by a cam 185 and valve $h$ is actuable through a link 186 pivoted to a slip clutch plate 187 carried frictionally by cam 185. Valve $f$ is actuable by a solenoid 188 energized through a limit switch 189 actuated by a cam 190. Cams 185 and 190, carried by shafts 25 on opposite sides of the machine respectively, are not shown in the drawings of the press.

The sequence will now be described beginning with the completion of cure of the tire and the press in closed condition. This situation is illustrated in Fig. 17. At this stage the sliders of valves $e$ and $g$ are in positions due to the vertical position of contacting arm 11′. The control pressure through valve $e$ is open to the vulcanization timer mechanism (not shown) and closed to the control valves. Therefore, although valve $g$ is open, and valve $h$ is open to $k'$ and to $p$ through $n$, there is no actuation of the controls, and $g$ is further cut out by closed valve $f$. With the press thus in closed position, the control lines are open to exhaust at valve $e$.

As the arm 11' swings in the opening movement of the press, the control pressure is immediately shifted from the timer to the control valves by valve e through the urging on its slider of a spring 191. At the same time, cam 185 turns in the direction marked "open" and link 186 moves leftward to close the pressure line from valve h to valve n and to diaphragm k', and to open the line from h to diaphragm m. The latter opens the line from bag 134' to vacuum through d in preparation for subsequent collapse of the bag by extension thereof under the urging of the piston of cylinder 84'. The closing of the line to k' keeps the air line to valve a from activating the piston of cylinder 84' in this initial stage of opening of the press.

Figure 11:
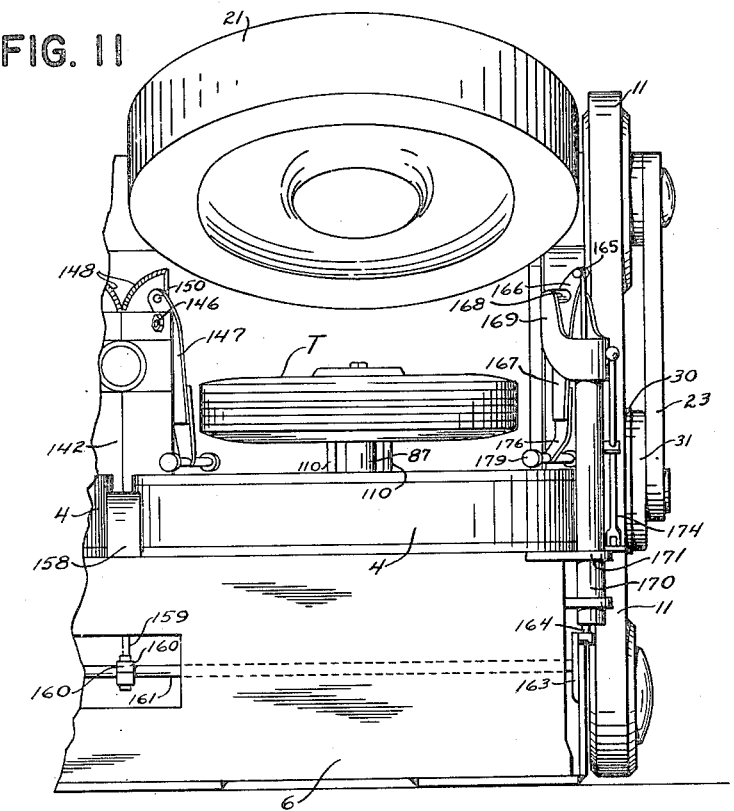

Following this stage, the mechanical lifter for the bag and tire comes into play, stripping the tire from the bottom mold section and raising the entire cylinder 84 with it, as already described. This produces the condition shown in Fig. 11. Upon somewhat further opening of the press, the roller of bell crank 184 leaves the cam surface 185 and valve n is closed to the pressure line and open to exhaust residual pressure above diaphragm p and thus close off valve b against the shaping pressure to bag 134'. Subsequently, the cam 190 operates limit switch 189 and solenoid 188 to open valve f. Simultaneously with the energization of solenoid 188, a limit switch (not shown) stops the press with the latter nearly in fully open position. The opening of valve f results in a lifting of the tire-holding arms through pressure in cylinder 141' by actuation of diaphragm i to open an air supply through valve c. Simultaneously there is a pressure on diaphragm k opening valve a to an air supply and an axial extension of bag 134' through the piston of cylinder 84', whereby the bag is stripped from the tire and the latter is lifted to its highest position by the tire-holding arms, producing the situation shown in Fig. 12. Thereafter the press motor is started at will through the medium of a push button, the mechanical lifter for the bagging mechanism is automatically thrown out and the latter drops, as already described, clearing the tire, with the result shown in Fig. 13. The motion of the press continues to fully open position and is stopped by a limit switch. The bag now being stripped from the tire and lowered, the tire, which is resting on arms 147, 167 in an elevated position, may be easily removed. Thereafter, the operator pushes on lever 174' to close valve g, shutting off the pressure to diaphragm i and exhausting trapped air from the same, whereby cylinder 141' is opened to vacuum through valve c and the tire holders drop. If this step is not accomplished by the operator, the same result will be achieved in the initial stages of the next closing of the press due to closure of valve f by solenoid 188.

A green tire may now be placed in the mold surrounding the bag and closure of the press started by means of a push button. Valve h is immediately reversed by rod 186 and this exhausts diaphragm m of valve d through h opening the line to valve b. The shaping pressure at valve b is still cut off due to closure of valve n. At the same time the line is opened from e to k' through h, so that both k and k' are acting to hold valve a open to bag-extending pressure. Further closing of the press results in closing of valve f to pressure by solenoid 188, exhausting k. If valve g has not previously been closed by operation of lever 174', the piston of cylinder 141' will now retract due to cutting off of pressure and opening to vacuum and the tire-holding arms will drop. Since f is now closed, valve a is actuated only by k' through valves e and h. When the press is about half closed, the cam 185 opens valve n, diaphragm p is actuated, and pressure is introduced into the bag 134' through valve b to shape the bag and tire, such action taking place against the pressure in cylinder 84'. When the press is fully closed, arm 11' shifts the pressure through the valve e to the timer and opens the control system to exhaust. Arm 11' also opens valve g, if closed, but there is no pressure through g due to the solenoid 188 remaining closed and the setting of valve e. Since there is now no pressure through h or f, diaphragms k and k' are released and 84' is exhausted through valve a. A valve r, operated by the timing mechanism closes the line from valve b and introduces fluid under high pressure into the bag 134' to effect flow of the tire tread material into the grooves of the mold. This completes one cycle for the controls.

It may be mentioned that even with the manual and automatic means for lowering the tire-holding arms to clear the press in its closing action, there is a further safeguard in that the arms are pressured by air and therefore would not present a completely rigid obstruction in the extreme case where they might happen to be contracted by the closing press. This element of safety is also present in the use of gas pressure to collapse the bag since there would be a cushioning action to prevent damage to the bag or tire if either should hang up in the stripping operations.

While a certain embodiment has been shown it is to be understood that the invention is not limited thereby, but that changes may be made in the size, shape, character and arrangement of the various component parts without departing from the spirit or scope of the appended claims.

What is claimed is:

1. In a vulcanizing press having relatively movable mold sections and a fluid-expansible bag for shaping the article to be molded, means responsive to the initial opening movement of one of the mold sections to raise the article and bag as a unit from another mold section, and fluid pressure means responsive to further opening movement of the said one of the mold sections to strip the bag from the said article.

2. In a vulcanizing press having relatively movable mold sections and a fluid-expansible bag for shaping the article to be molded, means responsive to the initial opening movement of one of the mold sections to raise the article and bag as a unit from another mold section, holding means for said article actuable by air pressure and positionable in response to said opening movement, and fluid pressure means responsive to further opening movement of the said one of said mold sections to strip the bag from said article.

3. In a vulcanizing press having relatively movable mold sections and a fluid-expansible bag for shaping the article to be molded, means responsive to the initial opening movement of one of the mold sections to raise the article and bag as a unit from another mold section, air-pressure means responsive to further opening movement of the said one of said mold sections to strip the bag from the article, and means responsive to still further opening movement of said one of said mold sections to inactivate the first-mentioned means whereby the extended bag is permitted to drop toward the said other mold section.

4. In a vulcanizing press having relatively movable mold sections and a fluid-expansible bag for shaping the article to be molded, means responsive to the initial opening movement of one of the mold sections to raise the article and bag as a unit from another mold section, holding means for said article actuable by fluid pressure and positionable in response to said opening movement, fluid-pressure means responsive to further opening movement of the said one of said mold sections to strip the bag from said article, and means responsive to still further opening movement of the said one of said mold sections to inactivate the first-mentioned means whereby the extended bag is permitted to drop toward the said other mold section while the said article remains supported on said holding means.

5. In a vulcanizing press having relatively movable mold sections and a fluid-expansible bag for shaping the article to be molded, means mounting the said bag at opposed portions thereof and constructed and arranged for movement of one of said portions relative to the other to provide for collapse of the bag by extension thereof in a direction parallel to the path of said movement, means responsive to the initial opening movement of one of the mold sections to raise the article and the entire bag-mounting means as a unit from another mold section, and fluid-pressure means responsive to further opening movement of the said one of said mold sections to separate the said mounting means and thus strip the bag from the article.

6. In a vulcanizing press having relatively movable mold sections and a fluid-expansible bag for shaping the article to be molded, means mounting the said bag at opposed portions thereof and constructed and arranged for movement of one of said portions relative to the other to provide for collapse of the bag by extension thereof in a direction parallel to the path of said movement, means responsive to opening of one of the mold sections to raise the article and the entire bag-mounting means as a unit from the other mold section, holding means for said article actuable by fluid pressure and positionable in response to said opening, and fluid-pressure means responsive to further opening of the said one of said mold sections to separate the said mounting means and thus strip the bag from the article on one side thereof.

7. In a vulcanizing press having relatively movable mold sections and a fluid-expansible bag for shaping the article to be molded, means mounting the said bag at opposed portions thereof and constructed and arranged for movement of one of said portions relative to the other to provide for collapse of the bag by extension thereof in a direction parallel to the path of said movement, means responsive to opening of one of the mold sections to raise the article and the entire bag mounting means as a unit from the other mold section, fluid-pressure means responsive to further opening of the said one of said mold sections to continue motion of one of said mounting means and thus strip the bag from the mold, and means responsive to still further opening of said one of said mold sections to inactivate the first-mentioned means whereby the bag and mounting means are permitted to drop toward the said other mold section.

8. In a vulcanizing press having relatively movable sections and a fluid-expansible bag for shaping the article to be molded, means mounting the said bag at opposed portions thereof and constructed and arranged for movement of one of said portions relative to the other to provide for collapse of the bag by extension thereof in a direction parallel to the path of said movement, means responsive to opening of one of the mold sections to raise the article and the entire bag-mounting means as a unit from the other mold sections, holding means for said article positionable in response to said opening, fluid-pressure means responsive to further opening of the said one of said mold sections to move one of said mounting means and thus strip the bag from said article, and means responsive to still further opening of the said one of said mold sections to inactivate the first-mentioned means, whereby the bag and mounting means are permitted to drop toward the other of said mold sections in extended condition while the said article remains supported on said holding means.

9. In a vulcanizing press having separable mold sections operable by a toggle linkage driven by a crank disc, a fluid-expansible bag associated with one of the mold sections for shaping an article to be cured, means associated with said disc and responsive to rotation thereof to lift the said bag and cured article as a unit, and fluid-pressure means responsive to further rotation of said disc to strip the said bag from one side of said article.

10. In a vulcanizing press having separable mold sections operable by a compound toggle linkage driven by a crank disc, a fluid-expansible bag associated with one of said mold sections for shaping an article to be cured, means associated with said disc and responsive to rotation thereof to lift the said bag and cured article as a unit, means responsive to further rotation of said disc to strip the said bag from one side of said article and means associated with one of the mold sections to maintain the said mold sections in parallelism during the aforementioned lifting and stripping to provide clearance therefor.

11. In a vulcanizing press having separable mold sections operable by a compound toggle linkage driven by a crank disc and connecting rod, a fluid-expansible bag associated with one of said mold sections for shaping an article to be cured, means associated with said disc and responsive to rotation thereof to lift the said bag and cured article as a unit, means responsive to further rotation of said disc to strip the said bag from said article and means associated with one of the mold sections to maintain the said mold sections in parallelism during the aforementioned lifting and stripping to provide clearance therefor, said last-mentioned means comprising means to constrain the disc-attached end of said connecting rod to a path other than circular whereby to improve mechanical advantage in said parallelism maintaining means.

12. In a vulcanizing press having separable mold sections operable by a toggle linkage driven by a crank disc and connecting rods, a fluid-expansible bag associated with one of said mold sections for shaping an article to be cured, means associated with said disc and responsive to rotation thereof to lift the said bag and cured article as a unit, means responsive to further rotation of said disc to strip the said bag from said article, means associated with one of said mold sections to maintain the said mold sections in parallelism during the aforementioned lifting and stripping operations to provide clearance therefor, said last-mentioned means comprising a second crank disc providing the connection between the said connecting rod and the first crank disc, and means to rotate the second crank disc whereby to vary the path of the disc-connected end of the connecting rod from circular orbital motion respecting the axis of the first crank disc.

13. The device of claim 12, said last-mentioned means comprising a planet gear keyed to the said second crank disc, and engaging a sun gear concentric with the said first crank disc but fixed against rotation therewith.

14. In a vulcanizing press, separable mold sections, a compound toggle mechanism for effecting relative movement of said mold sections including, a crank disc and a connecting rod having a pivotal connection with said crank disc, means constituting a fulcrum about which one of said mold sections may turn angularly with respect to the other of said mold sections as the toggle mechanism moves, cam means movable with the said crank disc to move said fulcrum means whereby to defer said angular turning of said mold section for a predetermined interval, and means for modifying the path of movement of the said pivotal connection of said connecting rod to divert said pivotal connection from truly circular motion about the axis of said crank disc.

15. In a vulcanizing press having relatively movable mold sections operable by a toggle mechanism and having a fluid-expansible bag means for shaping an article to be cured, a disc crank for operating the toggle mechanism, an arm pivoted on said disc crank eccentrically thereto, lifting means for said bag means comprising means engageable by the free end of said arm at a predetermined phase of rotation of said crank disc, and means responsive to continued rotation of said crank disc to lift said arm free of engagement with said lifting means.

16. In a vulcanizing press having relatively movable mold sections operable by a toggle mechanism and having a fluid-expansible bag means for shaping an article to be cured, a disc crank on a driven shaft for operating the toggle mechanism, an arm pivoted eccentrically to said disc crank, lifting means for said bag means comprising means engageable by the free end of said arm at a predetermined phase of rotation of said crank disc, said arm being positioned for disengagement from said lifting means by contact with said driven shaft at an advanced phase of rotation of said disc crank.

17. In a vulcanizing press, including, bag means for shaping an article to be vulcanized, separable mold sections, a compound toggle mechanism for effecting relative movement of said mold sections, a crank disc for operating said toggle mechanism through a connecting rod, means constituting a fulcrum about which one of said mold sections may turn angularly with respect to another of said mold sections as the toggle mechanism moves, cam means movable with the said crank disc to move said fulcrum means whereby to defer said angular turning of said one of said mold sections for a predetermined interval, a hook articulated to said crank disc, and means responsive to turning of said crank disc for lifting the said bag means into the space vacated by the said one of said mold sections prior to said angular turning of said one of said mold sections, said lifting means comprising a bell crank with an arm in contact with said bag means, and a rod articulated to another arm of said bell crank, and engageable by said hook during rotation of the said crank disc.

18. In a vulcanizing press, separable mold sections, a toggle mechanism for effecting relative movement of said mold sections, a crank disc for operating said toggle mechanism through a connecting rod, means constituting a fulcrum about which one of said mold sections may turn angularly with respect to the other of said mold sections as the toggle mechanism moves, cam means movable with the crank disc, follower means contacting said cam and operable to move said fulcrum means whereby to defer said angular turning of said mold section for a predetermined interval, and means modifying the path of movement of the pivot point of said connecting rod to divert the same from truly circular motion about the axis of said crank disc.

19. The device of claim 18, said last mentioned means comprising a second crank disc to which the said connecting rod is pivoted, a planet gear to move said second crank disc, and a sun gear in mesh with the planet gear and held against rotation.

20. A device as in claim 18, said follower means comprising a bell crank with one arm connected to the said fulcrum means, and the other arm engageable with the cam to positively prevent oscillation of the movable mold section in the closing operation.

21. In a vulcanizing press having relatively movable mold sections operated by a toggle mechanism, means to hold the mold sections in mutual parallelism during the initial stage of opening, fluid-expansible bag means for shaping an article to be cured, means to lift the bag means as a whole during the initial stage of opening of the press, and fluid-pressure-operated means to collapse the bag by elongation thereof in one direction during a later stage of opening of the press.

22. In a vulcanizing press having relatively movable mold sections operated by a toggle mechanism, means to hold the mold sections in mutual parallelism during the initial stage of opening, fluid-expansible bag means for shaping an article to be cured, means to lift the bag means as a whole during an early stage of opening of the press, and fluid-pressure-operated means to collapse the bag by elongation thereof in one direction to strip the bag from the cured article during a later stage of opening of the press, said lifting means being deactivated by still further rotation of the press whereby to permit dropping of the bag means.

23. In a vulcanizing press, a fixed lower mold section, a movable upper mold section, shaping means for an article to be cured comprising a collapsible bag movable as a whole axially of the bottom mold section, means responsive to closing of the press to introduce fluid into the bag, means responsive to opening of the press to lift the bag as a unit, means responsive to further opening of the press to extend the upper portion of the bag to strip the bag from the cured article, means also responsive to said further opening of the press to support the cured article while assisting the stripping operation, and means responsive to still further opening of the press to deactivate the bag lifting means, to permit dropping of the said bag-lifting means in extended condition.

24. In a vulcanizing press, a fixed lower mold section, a movable upper mold section, shaping means for an article to be cured comprising a collapsible bag movable as a whole axially of the bottom mold section, means responsive to closing of the press to introduce fluid into the bag, means responsive to initial opening of the press to provide escape for fluid from the bag, means responsive to a second stage of opening of the press to lift the bag as a unit, means responsive to a third stage of opening of the press to extend the upper portion of the bag to strip the bag from the cured article, means responsive to a stage of opening of the press substantially concurrent with said third stage to support the cured article, and means responsive to a fourth stage of opening of said press to deactivate the said bag-lifting means, whereby the bag is lowered.

25. In a vulcanizing press, shaping means comprising a fluid-expansible bag and inflation control means therefor including a first valve, bag-collapsing means and control means therefor including a second valve, a third valve operable in the initial opening and final closing of the press, connected to a pressure supply, and being closed to the supply in the closed position of the press, a fourth valve connected in series between the said third and first valves and also in series between the said third and second valves, a fifth valve connected in series between the said fourth and first valves, a sixth valve connected in series between the said third and second valves, means responsive to initial opening and closing action of the press to close the said fourth valve against pressure communication to said first and second valves, means responsive to a further stage of open condition of the press to close said fifth valve against pressure communication to said first valve and means responsive to a still further stage of open condition of the press to open said sixth valve to pressure communication with said second valve.

26. In a system as in claim 25, lifting and holding means for a vulcanized article, and having control means including a seventh valve, said seventh valve located in series connection between the said sixth valve and the last-mentioned control means and adapted to open the latter to pressure from the said sixth valve responsive to closing of the press, and to cut off such pressure manually when the press is open.

27. In a vulcanizing press having relatively movable mold sections, a toggle mechanism for moving the mold sections and a rotatable disc actuating the toggle mechanism through a connecting rod and a pivot eccentrically located on the disc, the improvement comprising a pivotal mounting for said connecting rod in the pivot on said disc and eccentric to the said pivot and means to rotate the pivotal mounting of said connecting rod about said pivot as the disc rotates.

28. The device of claim 27, said means comprising a planet gear connected with said pivot journaled in the said disc and engaging a sun gear concentric with but stationary with respect to said disc.

29. In a vulcanizing press having relatively movable mold sections and a bagging mechanism for shaping articles to be cured, associated with said mold sections and operable by motion of said press, a first toggle mechanism aligned with the mold axis in closed position of the press, a second toggle mechanism for closing the first toggle mechanism and comprising a crank disc journaling an eccentric crank, and a connecting rod journaled to said eccentric crank, an arm connected with one of the mold sections, guide means for said arm to hold said one of said mold sections in parallelism with the other mold section to accommodate distension of said bagging mechanism as the press moves, and means to lift the said arm in said guide means, said last means comprising a follower contacting a cam carried by the said crank disc.

30. A press as in claim 29, said journaled crank comprising a planet gear engaging a sun gear concentric with but stationary with respect to the crank disc.

31. A press for shaping and curing pneumatic tires comprising two relatively movable mold sections, means for moving at least one of said sections in a direct axial line during the period that the press is approaching its closed position and during the beginning of its opening movement, a flexible diaphragm within the press, two diaphragm-supporting rings secured to the edges of the diaphragm, means to hold the rings in spaced relation when the press is open but to permit them to approach as the press is closed, means operative during the opening movement of the press to move said rings in the same direction, for a limited distance to lift the tire out of the mold, and means to thereafter raise the upper ring during stationary condition of the lower ring.

32. A press for shaping and curing pneumatic tires comprising two relatively movable mold sections, means for moving at least one of said sections in a direct axial line during the period that the press is approaching its closed position and during the beginning of its opening movement, a flexible diaphragm within the press, two diaphragm-supporting rings secured to the edges of the diaphragm, means to hold the rings in spaced relation when the press its open but to permit them to approach as the press is closed, means operative during the opening movement of the press to move said rings in the same direction, for a limited distance to lift the tire out of the mold, means to thereafter raise the upper ring during stationary condition of the lower ring, and a tire engaging device, movable by means of a resilient connection to hold the tire and urge the same upwardly while the diaphragm is stripped from the tire.

33. A press for shaping and curing pneumatic tires comprising two relatively movable mold sections, means for moving at least one of said sections in a direct axial line during the period that the press is approaching its closed position and during the beginning of its opening movement, a flexible diaphragm within the press, two diaphragm supporting rings secured to the edges of the diaphragm, means to hold the rings in spaced relation when the press is open but to permit them to approach as the press is closed, means operative during the opening movement of the press to move said rings in the same direction, for a limited distance to lift the tire out of the mold, means to thereafter raise the upper ring during stationary condition of the lower ring, tire-supporting means located outside the mold while it is closed but movable into the mold cavity and beneath the tire when the mold is open, and means to move said supporting means concurrently with the opening and closing of the mold.

34. A tire shaping and vulcanizing press comprising two mold sections, one of said sections being stationary, means to move the other section in a straight axial line during the later part of the press closing movement and the fore part of the press opening movement, a flexible and expansible diaphragm within the mold sections about which the tire is shaped and vulcanized, a diaphragm supporting ring attached to each edge of the diaphragm, means to move both rings simultaneously after the press starts to open to remove the vulcanized tire from the stationary mold section, means acting after the tire is free of the stationary mold section to interrupt the said means to move both rings, and means to thereafter resume upward movement of the top ring, during stationary condition of the lower ring, until the diaphragm is stripped from the tire.

35. In a press as in claim 34, means to deactivate the said means to move both rings, whereby both said rings descend in separated condition after stripping of the diaphragm from the tire.

36. A press for shaping a tire band to tire form and vulcanizing it in that form, said press having a lower mold section, an upper mold section movable toward and from the lower section to complete the tire molding cavity, a flexible and expansible diaphragm within the mold over which the band is telescoped when the press is open, an upper ring secured to one edge of the diaphragm, a lower ring secured to the other edge of the diaphragm, a protruding ledge on the lower ring to support the lower edge of the tire band, a sliding connection between the two rings whereby the rings may be lifted in unison or the top ring raised relatively to the bottom ring, a lifting device operative after the molds are opened to raise both rings in unison to lift a vulcanized tire from the lower mold section, means to continue raising the top ring during stationary condition of the bottom ring, and means to inactivate the lifting device after the diaphragm has been stripped from the tire by said continued rise of the top ring, whereby both rings are permitted to descend.

37. A press of the type having two mold sections in which a tire is shaped from a flat band to tire form during the closing together of the mold sections and in which a flexible and expansible diaphragm is located within the tire and having means to supply fluid pressure to the interior of the diaphragm when the press is closed, an upper ring attached to one edge of the diaphragm and a lower ring attached to the other edge of the diaphragm, said rings completing a hollow chamber of which the diaphragm constitutes the outer wall, a seat for the lower ring in the mold section and means operative after the upper mold section has cleared the tire to raise both rings for a limited distance in unison to strip the tire from the lower mold section, means to thereafter continue raising the top ring to strip the tire from the mold, and means to lower both rings in extended relation.

38. A press for forming a flat tire band into tire shape having separable mold sections, means to open and close the press above the band, two superimposed rings and a diaphragm secured by its edges to the edges of the rings, a piston connected to the upper ring and a cylinder surrounding said piston and connected to the lower ring, a drive shaft in the press to open and close the mold sections, means operated by the drive shaft to lift said cylinder and piston in unison to strip a finished tire from the lower mold section, and fluid-pressure means to extend said piston whereby to strip the diaphragm from the finished tire.

39. In a press as in claim 38, means responsive to continued rotation of said shaft to deactivate said lifting means whereby said rings are lowered.

40. A press for forming a flat tire band into tire shape having separable mold sections, means to open and close the press above the band, two superimposed rings and a diaphragm secured by its edges to the edges of the rings, mechanical means responsive to early stages of opening of the press to move both rings a limited extent upward in unison to strip the finished tire from the lower mold section, and gas pressure means to continue upward movement of the upper ring relative to the lower ring to strip the diaphragm from the tire.

41. In a press as in claim 40, means responsive to further opening of the press to deactivate the mechanical means while maintaining the gas pressure means whereby the rings are permitted to descend in extended position.

42. A press for forming a flat tire band into tire shape having separable mold sections, means to open and close the press above the band, two superimposed rings and a diaphragm secured by its edges to the edges of the rings, mechanical means responsive to early stages of opening of the press to move both rings a limited extent upward in unison to strip the finished tire from the lower mold section, means swingable into the region between the mold sections to support the tire, gas pressure means to continue upward movement of the upper ring relative to the lower ring to strip the diaphragm from the tire, and gas pressure means to operate said tire-supporting means substantially simultaneously with the said continued upper movement of the upper ring whereby the tire is urged upwardly to assist the stripping of the diaphragm.

43. In a press as in claim 42, deactivating means for said mechanical means whereby both said rings are permitted to descend in extended relation to clear the supported tire.

LESLIE E. SODERQUIST.

REFERENCES CITED

The following references are of record in the file of this patent:

UNITED STATES PATENTS

| Number | Name | Date |
|---|---|---|
| 1,969,217 | Haiss | Aug. 7, 1934 |
| 2,019,888 | Bostwick | Nov. 5, 1935 |
| 2,308,977 | Iverson et al. | Jan. 19, 1943 |
| 2,343,641 | Brundage | Mar. 7, 1944 |